(12) United States Patent
Sedor et al.

(10) Patent No.: US 9,140,872 B2
(45) Date of Patent: Sep. 22, 2015

(54) HYDRA CABLE ASSEMBLY AND COMPONENTS THEREOF

(71) Applicant: Panduit Corp., Tinley Park, IL (US)

(72) Inventors: Thomas M. Sedor, Orland Park, IL (US); Yuri M. Gallegos, Plainfield, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 14/466,028

(22) Filed: Aug. 22, 2014

(65) Prior Publication Data

US 2015/0078720 A1    Mar. 19, 2015

Related U.S. Application Data

(60) Provisional application No. 61/878,797, filed on Sep. 17, 2013.

(51) Int. Cl.
| G02B 6/00 | (2006.01) |
|---|---|
| G02B 6/44 | (2006.01) |
| G02B 6/38 | (2006.01) |

(52) U.S. Cl.
CPC .............. *G02B 6/4472* (2013.01); *G02B 6/387* (2013.01)

(58) Field of Classification Search
CPC ...... G02B 6/4471; G02B 6/3825; G02B 6/36; G02B 6/389; G02B 6/3893; G02B 6/4239
USPC ................. 385/136–138, 76, 81, 84
See application file for complete search history.

(56) References Cited

U.S. PATENT DOCUMENTS

| 4,826,277 | A   | 5/1989  | Weber et al. |
| 5,792,986 | A   | 8/1998  | Lee |
| 5,838,861 | A   | 11/1998 | Bunde |
| 5,861,575 | A   | 1/1999  | Broussard |
| 5,903,693 | A   | 5/1999  | Brown |
| 5,915,055 | A   | 6/1999  | Bennett et al. |
| 5,970,195 | A   | 10/1999 | Brown |
| 5,984,717 | A   | 11/1999 | Lee |
| 6,072,932 | A   | 6/2000  | Bennett et al. |
| 6,101,306 | A * | 8/2000  | Engstrand et al. ............ 385/137 |
| 6,278,831 | B1  | 8/2001  | Henderson et al. |
| 6,304,708 | B1* | 10/2001 | Fukuyama et al. ........... 385/137 |
| 6,389,214 | B1  | 5/2002  | Smith et al. |
| 6,438,299 | B1  | 8/2002  | Brown et al. |

(Continued)

FOREIGN PATENT DOCUMENTS

| CH | 698717 B1 | 10/2009 |
| JP | H08304678 A | 11/1996 |
| JP | 2004294682 A | 10/2004 |

*Primary Examiner* — Ellen Kim
(74) *Attorney, Agent, or Firm* — Christopher S. Clancy; Yuri Astvatsaturov

(57) ABSTRACT

Embodiments of the present invention relate to fiber optic hydra cable assemblies and components thereof. In an embodiment, the present invention is a fiber optic cable transition which includes a front housing having a front opening, a rear opening, and an internal wall positioned inside of the front housing. The fiber optic cable transition also includes a front boot having a distal end, a proximal end, and a flange, the front boot being positioned at least partially inside the front housing such that the flange abuts the internal wall. The fiber optic cable transition also includes a rear housing having a distal end and a proximal end, where the rear opening of the front housing is joined to the proximal end of the rear housing.

20 Claims, 10 Drawing Sheets

(56) References Cited

U.S. PATENT DOCUMENTS

| | | | |
|---|---|---|---|
| 6,738,555 B1 | 5/2004 | Cooke et al. | |
| 6,764,221 B1 | 7/2004 | de Jong et al. | |
| 6,771,861 B2 | 8/2004 | Wagner et al. | |
| 7,113,679 B2 * | 9/2006 | Melton et al. | 385/113 |
| 7,270,485 B1 | 9/2007 | Robinson et al. | |
| 7,280,725 B2 | 10/2007 | Brown et al. | |
| 7,461,981 B2 | 12/2008 | Yow, Jr. et al. | |
| 7,494,284 B2 | 2/2009 | Robinson et al. | |
| 7,556,441 B2 * | 7/2009 | Furuyama | 385/95 |
| 7,621,675 B1 * | 11/2009 | Bradley | 385/81 |
| 7,711,236 B2 | 5/2010 | Gonzalez et al. | |
| 7,711,237 B2 * | 5/2010 | Hamasaki et al. | 385/137 |
| 7,738,759 B2 | 6/2010 | Parikh et al. | |
| 7,856,888 B2 * | 12/2010 | Ferguson | 73/800 |
| 7,903,925 B2 | 3/2011 | Cooke et al. | |
| 7,955,004 B2 | 6/2011 | Dimarco | |
| 8,155,490 B2 | 4/2012 | De Jong et al. | |
| 8,172,465 B2 | 5/2012 | Kleeberger | |
| 8,221,006 B2 | 7/2012 | Theuerkorn | |
| 8,267,596 B2 | 9/2012 | Theuerkorn | |
| 8,290,333 B2 | 10/2012 | Barlowe et al. | |
| 8,301,004 B2 | 10/2012 | Cooke et al. | |
| 8,364,000 B2 | 1/2013 | Gonzalez et al. | |
| 8,380,029 B2 | 2/2013 | Cline et al. | |
| 8,401,353 B2 | 3/2013 | Barker et al. | |
| 8,457,461 B2 | 6/2013 | Ott | |
| 2003/0021548 A1 * | 1/2003 | Luther et al. | 385/86 |
| 2005/0276551 A1 * | 12/2005 | Brown et al. | 385/100 |
| 2008/0138026 A1 * | 6/2008 | Yow et al. | 385/137 |
| 2010/0054676 A1 | 3/2010 | Cooke et al. | |
| 2011/0091169 A1 | 4/2011 | Van Der Meulen et al. | |
| 2012/0051710 A1 | 3/2012 | Zeng et al. | |
| 2012/0301090 A1 * | 11/2012 | Cline et al. | 385/103 |
| 2013/0136401 A1 * | 5/2013 | Cooke et al. | 385/80 |

* cited by examiner

HYDRA CABLE ASSEMBLY AND COMPONENTS THEREOF

CROSS-REFERENCE TO RELATED APPLICATIONS

This application claims the benefit of U.S. Provisional Patent Application No.: 61/878,797, filed on Sep. 17, 2013, which is incorporated herein by reference in its entirety.

FIELD OF INVENTION

Embodiments of the present invention generally relate to fiber optic hydra cable assemblies, and more specifically, to fiber optic assemblies used to furcate one or more fibers from a multi-fiber cable into individual furcation tubes.

BACKGROUND

In fiber optic networking, it is sometimes advantageous to bundle multiple optical fibers together into a single cable. This is often done to save space since the diameter of the actual fiber (the core and the cladding) is typically considerably smaller than the shielding (buffer and jacket) used to protect said fiber. As a result, it is possible to bundle together relatively large numbers of fibers (e.g., 12, 24, 36, 48, etc.), shielding the entire bundle and avoiding shielding each fiber individually. Such multi-fiber cables can take on many forms, including rounded cables and fiber ribbons.

While the multi-fiber cables may be terminated to a multi-fiber connector (e.g., an MPO connector) not all electronic equipment is designed to accept such multi-fiber connectors. Furthermore, there may be instances where a multi-fiber bundle may be carrying signals directed to or from multiple pieces of equipment. Consequently, this creates a need to breakout (also referred to as "furcate") individual or a series of individual optical fibers from a multi-fiber cable so that those fibers can be directed to the necessary equipment.

One way of achieving the desired breakout has been to employ a cable transition structure in various applications. However, in using such cable transitions, it is necessary to take into account potential concerns such as the maximum bend radius of the fibers, the stress which the fibers may undergo as a result of the breakout, and how the environmental conditions may impact the fiber's performance. These and other inherent challenges associated with fiber optic communication continue to create the need for improved breakout harness designs.

SUMMARY

Accordingly, at least some embodiments of the present invention are directed towards designs for cable transitions and to furcation harnesses which employ said cable transitions.

In an embodiment, the present invention is a fiber optic cable transition which includes a front housing having a front opening, a rear opening, and an internal wall positioned inside of the front housing. The fiber optic cable transition also includes a front boot having a distal end, a proximal end, and a flange, the front boot being positioned at least partially inside the front housing such that the flange abuts the internal wall. The fiber optic cable transition also includes a rear housing having a distal end and a proximal end, where the rear opening of the front housing is joined to the proximal end of the rear housing.

In another embodiment, the present invention is a fiber optic cable harness including a multi-fiber cable carrying a plurality of optical fibers, a plurality of furcation tubes, and a fiber optic cable transition. The optic cable transition includes a front housing having a front opening, a rear opening, and an internal wall positioned inside of the front housing. The optic cable transition also includes a front boot having a distal end, a proximal end, and a flange, the front boot being positioned at least partially inside the front housing such that the flange abuts the internal wall. The optic cable transition also includes a rear housing having a distal end and a proximal end where the rear opening of the front housing is joined to the proximal end of the rear housing. Wherein the multi-fiber cable being received in the distal end of the rear housing, the plurality of furcation tubes being received in the front boot, and at least one of the plurality of optical fibers being routed from the multi-fiber cable to a respective one of the plurality of furcation tubes within the fiber optic cable transition.

In yet another embodiment, the present invention is a method of assembling a fiber optic cable harness.

These and other features, aspects, and advantages of the present invention will become better-understood with reference to the following drawings, description, and any claims that may follow.

DETAILED DESCRIPTION

Embodiments of the present invention make use of a cable transition design and in some embodiment implement said design in various cable harness configurations (also known as hydra cables). A "cable transition" can be defined as the central section of a cable harness that transitions optical fibers from a multi-fiber cable (typically terminated with an MPO connector) to individual furcation tubes (typically terminated with single fiber connectors such as the SC/LC/FC/ST or duplex fiber connectors such as the LC Uniboot).

Figure 1:
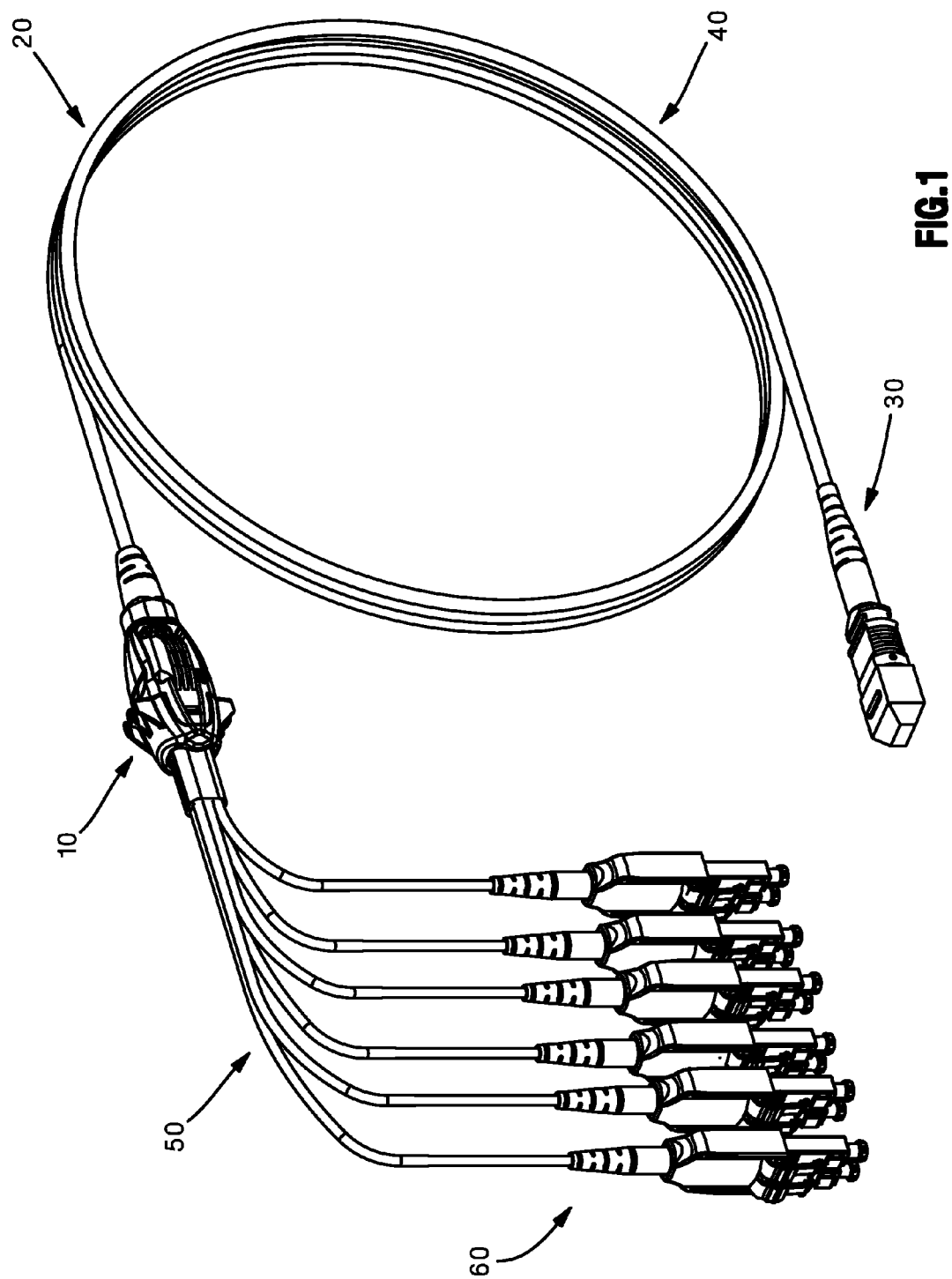
FIG. 1 illustrates a cable harness according to an embodiment of the present invention.

Referring to FIG. 1, an embodiment of a cable transition 10 is illustrated as being used within a hydra cable 20. Besides the cable transition 10, the hydra cable 20 includes a multi-fiber connector 30 (e.g., a 12-fiber, a 24-fiber, a 36-fiber, a 48-fiber, etc., MPO connector), a multi-fiber cable 40 (e.g., a 12-fiber, a 24-fiber, a 36-fiber, a 48-fiber, etc., cable), a plurality of furcation tubes 50, and a plurality of fiber optic connectors 60 mounted on the ends of the furcation tubes. The cable transition 10 provides a linking structure which links the multi-fiber cable 40 and the furcation tubes 50, and houses the fibers of a multi-fiber cable as they are transitioned from the multi-fiber cable 40 to the furcation tubes 50.

Figure 2:
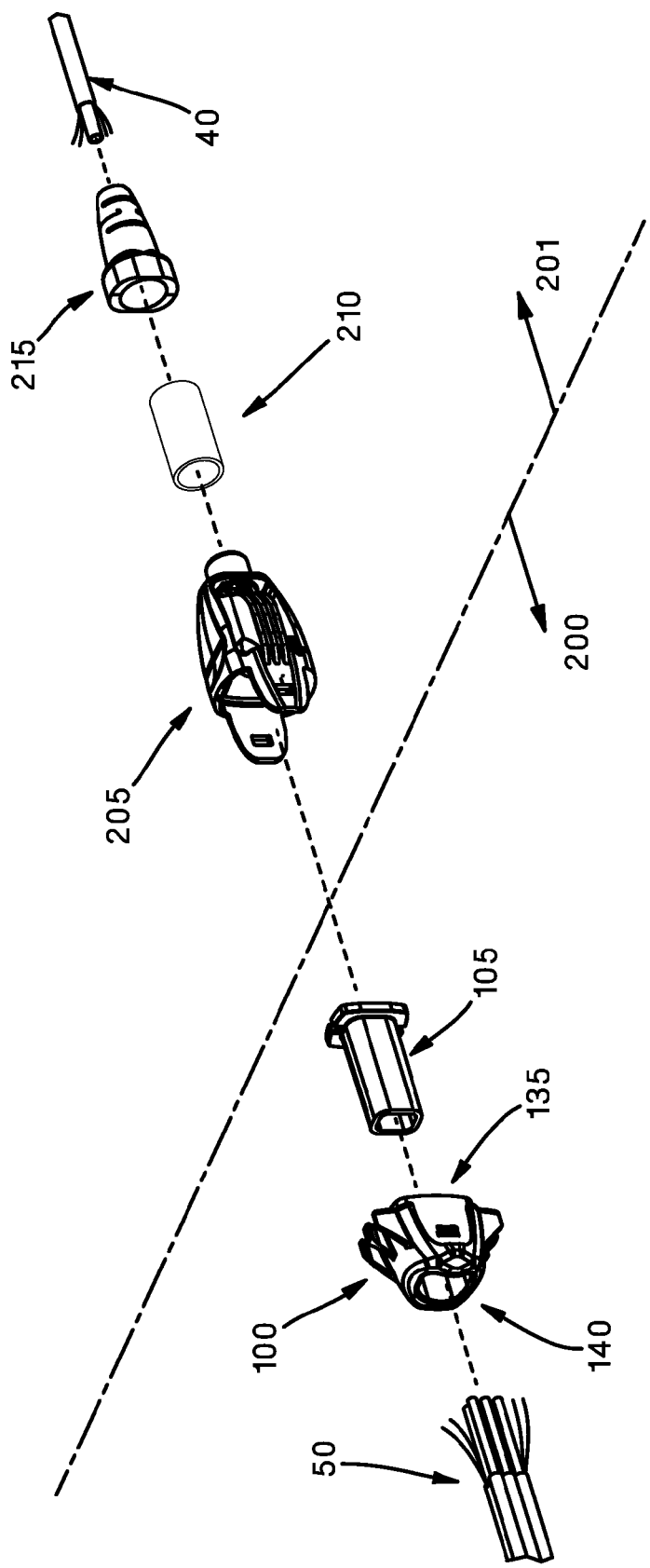
FIG. 2 illustrates a cable transition according to an embodiment of the present invention.
Figure 3:
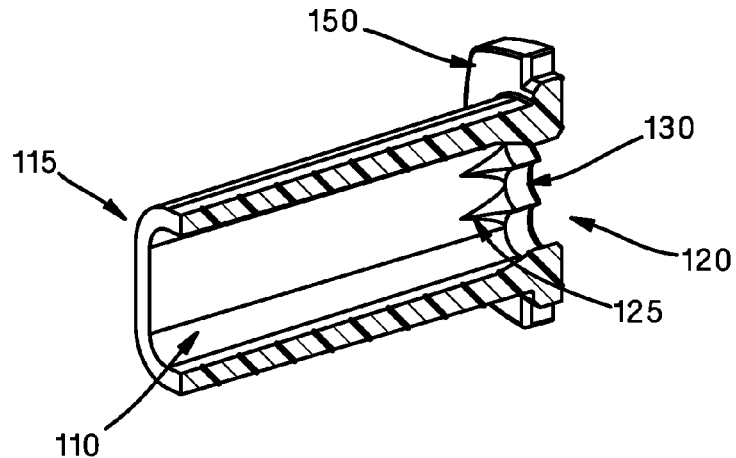
FIG. 3 illustrates a cross-sectional view of the front boot of the cable transition of FIG. 2.

FIG. 2 shows an exploded view of the cable transition 10 which comprises a front housing sub-assembly 200 and a rear housing sub-assembly 201. The front housing sub-assembly includes a front housing 100, which is preferably made of a rigid structure such as plastic, and a front boot 105, which is preferably made of some elastomeric material such as, but not limited to, rubber or silicone. As shown in FIG. 3, the front boot 105 includes a generally hollow cavity 110 extending between the distal end 115 and the proximal end 120. Near the proximal end 120, the cavity 110 includes a series of tapered ramps 125 which taper into a series of furcation tube apertures 130. Depending on an embodiment, the furcation tube apertures 130 may be semi-enclosed or they may form individual and separate apertures. The tapered ramps 125 are designed to guide the furcation tubes 50 as said furcation tubes are inserted into the front boot 105 through its distal end 115. As the tubes 50 are guided up the tapered ramps 125 and into the apertures 130, the furcation tubes are compressed. This causes a compressive force to be exerted between the walls of the apertures 130 and the furcation tubes, and between the individual furcation tubes 50, thereby providing at least some level of restraint of the furcation tubes in relation to the front boot 105.

Figure 4:
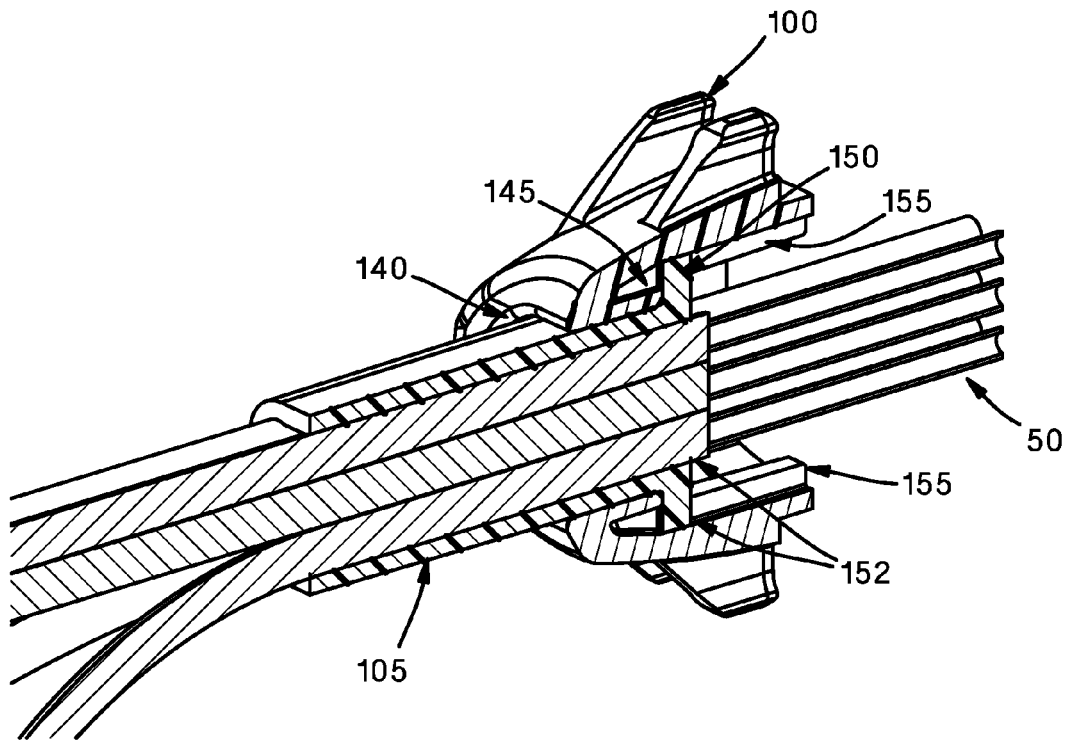
FIG. 4 illustrates a cross sectional view of an assembled front housing sub-assembly of the transition of FIG. 2.

The front boot 105 joins the front housing 100 by passing through the housing's rear portion 135 and partially exiting its front opening 140. A cross sectional view of an assembled front housing sub-assembly is shown in FIG. 4. The front housing 100 includes a front housing internal wall 145 which extends backwards from the front opening 140. The internal wall 145 interfaces with a flange 150 that is positioned near the proximal end 120 of the front boot. When the front boot is inserted into the front housing, the internal wall 145 catches the flange 150, preventing the front boot 105 from being pulled out of the front housing 100.

Preferably the flange 150 extends fully around the circumference of the front boot 105. Also, preferably the flange 150 is sufficiently large to make contact with the internal surface of the front housing 100. This can provide a seal in the region 152 between the internal cavity of the front housing and the front opening 140, the utility and benefit of which will be explained later in the specification.

To help guide the front boot 105 into the assembled position, the front housing 100 includes a pair of guide rails 155 positioned on the internal surface thereof. A corresponding pair of notches 160 (see FIG. 5A) is formed in the flange 150 of the front boot 105. When the guide rails 155 and the notches 160 are lined up, the front boot resists potential rotational displacement relative to the front housing, helping with the accuracy of the installation. In addition, the guide rails 155 may be tapered such that the distance therebetween decreases as the guide rails extend from the rear portion 135 to the front opening 140. This configuration can provide an increasing level of compression of the front boot in the region of the proximal end 120 by causing the flange 150, and thereby the proximal end 120, to compress as the flange travels from the rear portion 135 towards the internal wall 145. The resulting compression may help retain the furcation tubes in place. The compression may further reduce any openings between the furcation tubes 50, between the furcation tubes 50 and the front boot 105, and/or between the front boot 105 and the internal surface of the front housing 100, enhancing the sealing effect the benefits of which will be explained later in the specification. Alternatively, similar compression may be achieved by tapering the entire internal surface of the front housing 100 such that the flange 150 is compressed as its position is advanced towards the internal wall 145.

Figure 5A:
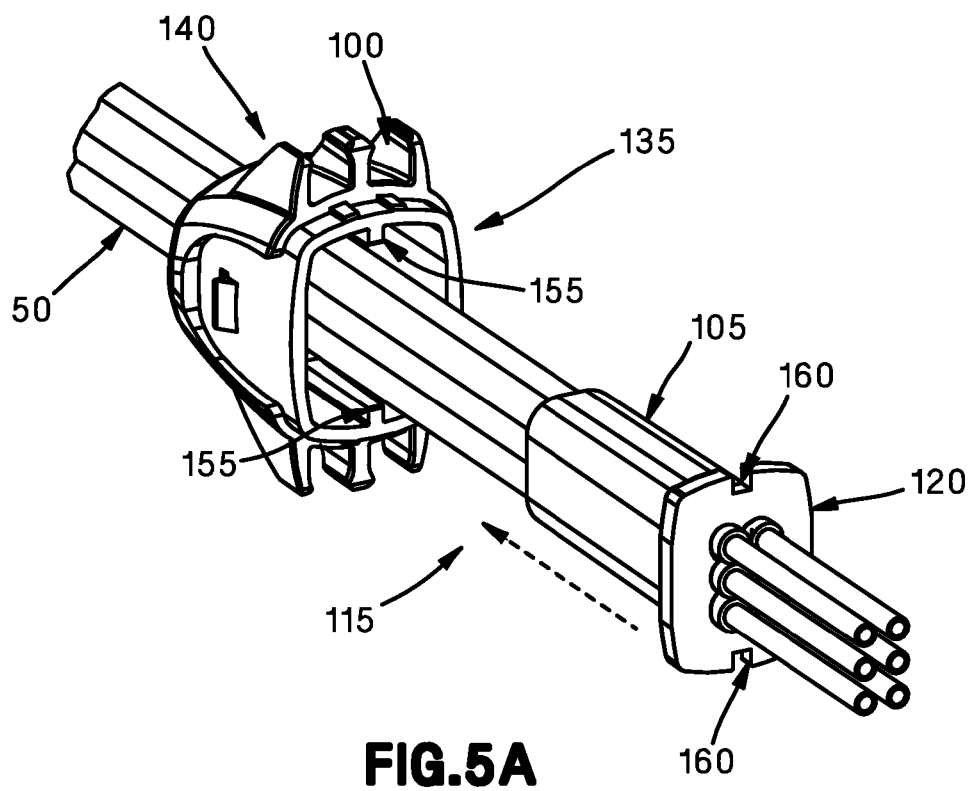
FIGS. 5A and 5B illustrate an embodiment of a process of assembling the front housing sub-assembly of the transition of FIG. 2.

Referring to FIG. 5A, to assemble the front housing 100 and the front boot 105, the front housing is first slipped over the furcation tubes 50 with the furcation tubes entering the front opening 140 and exiting through the rear section 135. The furcation tubes 50 are then guided through the distal end 115 of the front boot and out through the proximal end 120. In some embodiments, the ends of the furcation tubes are aligned flush with one another. In alternate embodiments the tubes may be aligned as desired by the installer/assembler/user. The furcation tubes may be positioned such that they extend a certain distance past the proximal end 120. Alternatively, the furcation tubes may be aligned flush with the proximal end of the front boot 105. In embodiments where furcation tubes include strength members such as aramid yarn, it is preferable to have said strength members extend into the internal cavity of the front housing 100. To complete the assembly of the front housing sub-assembly, the front boot 105 is then pulled forward into the front housing until the flange contacts the internal wall as previously described. The initial compression between the furcation tubes, and between the furcation tubes and the front boot, may help retain the components in their pre-assembled state prior to pulling the front boot into the front housing.

Figure 5B:
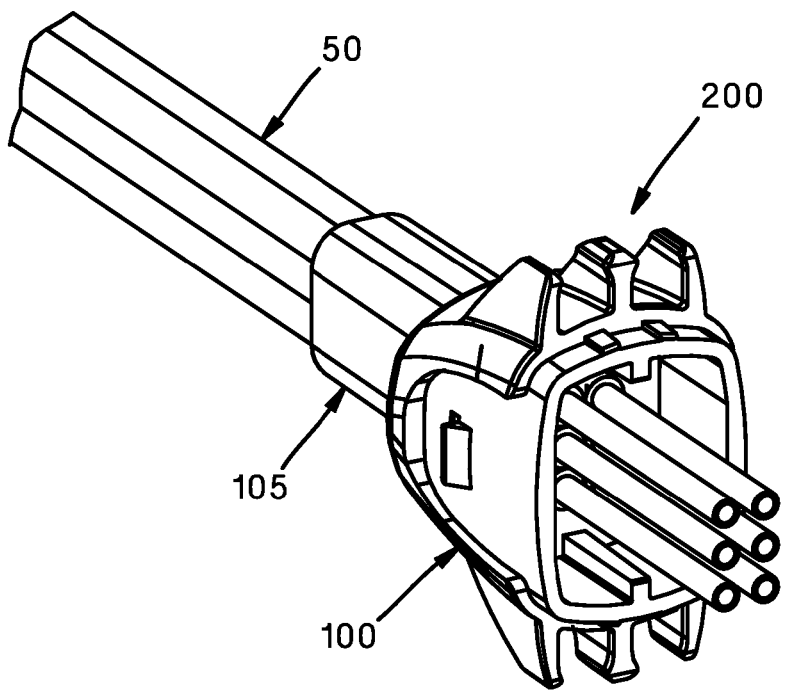

In alternate embodiments, the above-described process for assembling the front housing sub-assembly may be modified such that the furcation tubes 50 are first assembled into the front boot 105. In these embodiments, the furcation tubes 50 are threaded through the rear portion 135 of the front housing 100. An assembled front housing sub-assembly is shown in FIG. 5B.

Figure 6A:
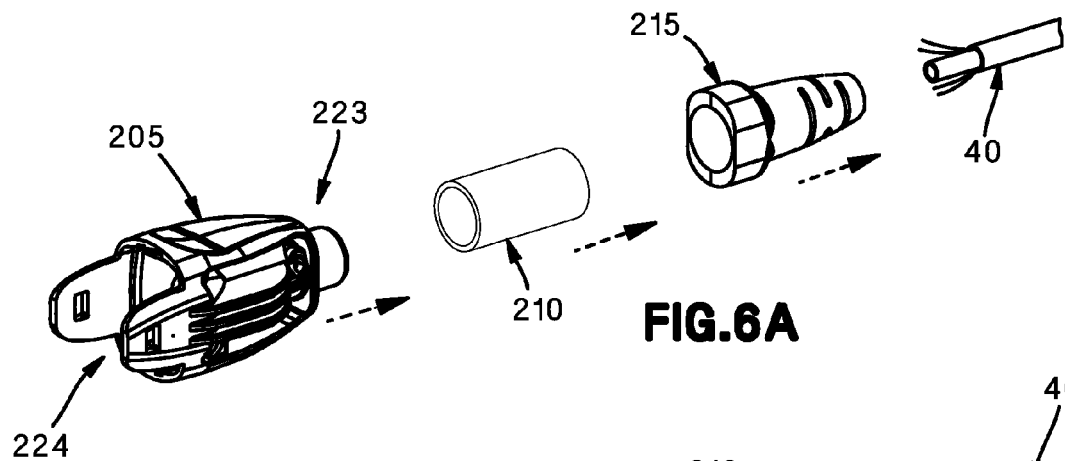
FIGS. 6A-6C illustrate an embodiment of a process of assembling the rear housing sub-assembly of the transition of FIG. 2.
Figure 6B:
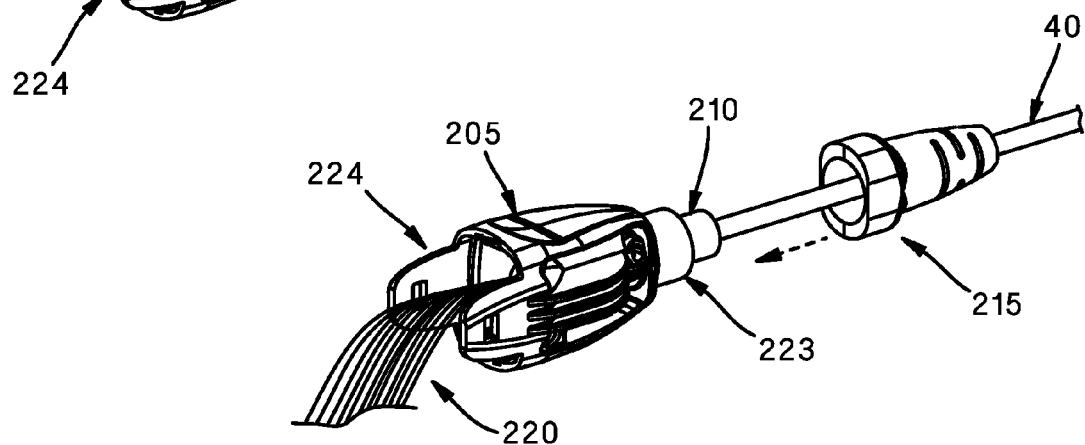
Figure 6C:
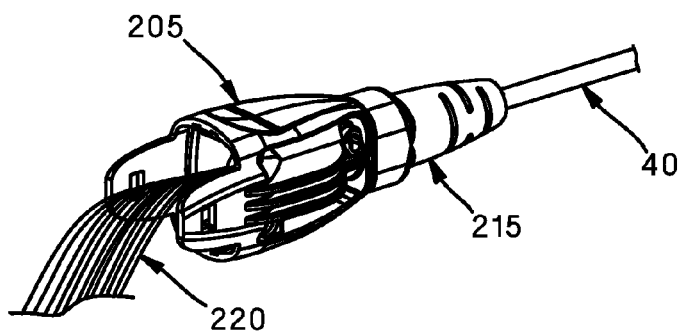

Referring back to FIG. 2, the transition 10 further includes a rear housing sub-assembly 201. The rear-housing sub-assembly 201 includes a rear housing 205 which is preferably made from a rigid material such as plastic, a heat shrink 210, and a rear boot 215 which is preferably made from an elastomeric material such as, for example, rubber or silicone. As shown in FIGS. 6A-6C, to assemble the rear housing sub-assembly, the rear boot 215, the heat shrink 210, and the rear housing 205 are slipped over the multi-fiber cable 40 in that order. The multi-fiber cable 40 is pulled forward through the rear housing 205 and the multi-fiber cable's outer jacket is stripped to the required length to expose the bare fibers 220. In embodiments where the multi-fiber cable 40 includes strength members such as aramid yarn, it is preferable to expose said strength members such that they are positioned within the internal cavity of the rear housing 205. Next, the heat shrink 210 is shrunk around the rear round end 223 of the rear housing 205. The rear boot 215 is then installed over the rear housing/heat shrink combination to create the rear housing sub-assembly. The rear housing 205 includes a tapered internal cavity that tapers inward as it extends from the proximal end 224 to the rear end 223. This tapered design reduces the internal volume of the transition, the potential benefits of which will be explained later in the specification.

Figure 7A:
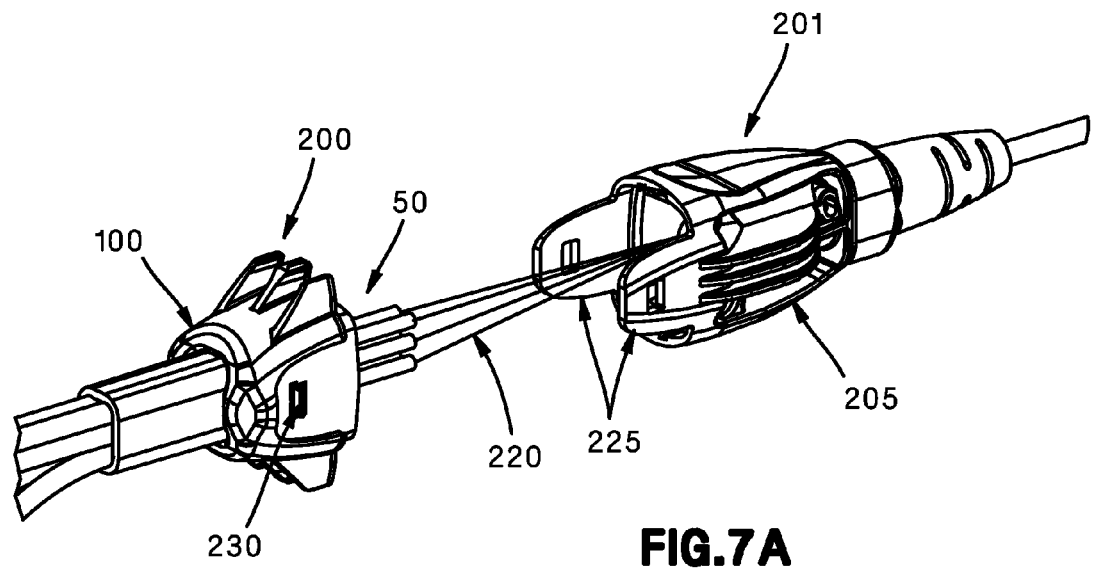
FIGS. 7A and 7B illustrate an embodiment of a process of joining the front housing sub-assembly of FIG. 5B and the rear housing sub-assembly of FIG. 6C.
Figure 7B:
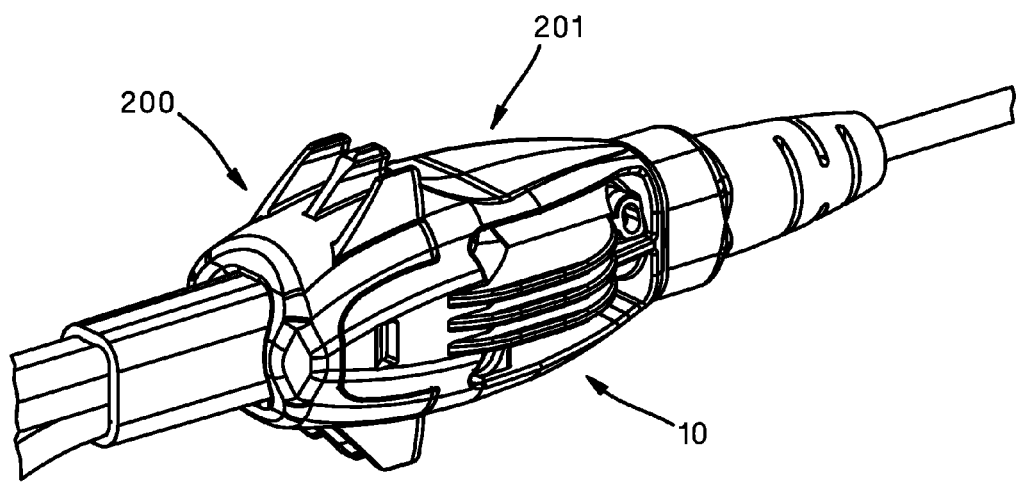

Once both the front and rear housing sub-assemblies 200, 201 are respectively assembled, each set of bare fibers 220 (or alternatively each single fiber 220) from the multi-fiber cable 40 is fed into the appropriate furcation tube 50 in the front housing sub-assembly 200 as shown in FIG. 7A. The front housing sub-assembly 200 is then aligned with and slid towards the rear housing sub-assembly 201. The two tabs 225 which extend from the rear housing 205 engage the two latches 230 which are position on the front housing 100, securing both sub-assemblies 200,201 together. FIG. 7B shows the transition 10 after the two housing sub-assemblies 200,201 have been joined.

Figure 8A:
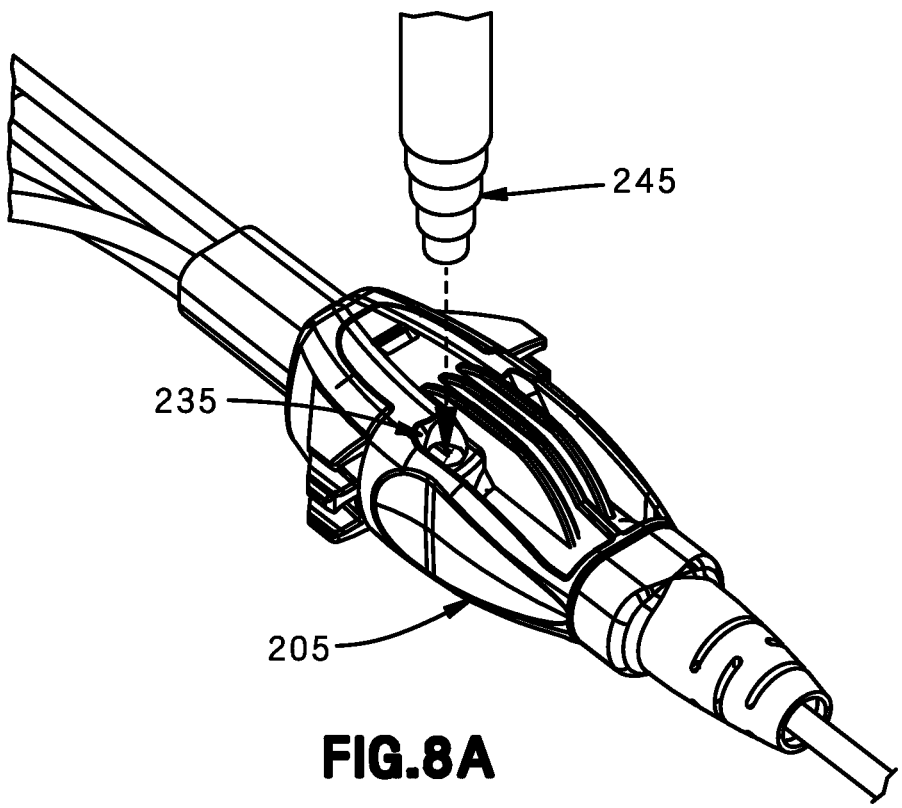
FIGS. 8A and 8B illustrate an embodiment of a process of injecting adhesive into the transition of FIG. 7B.
Figure 8B:
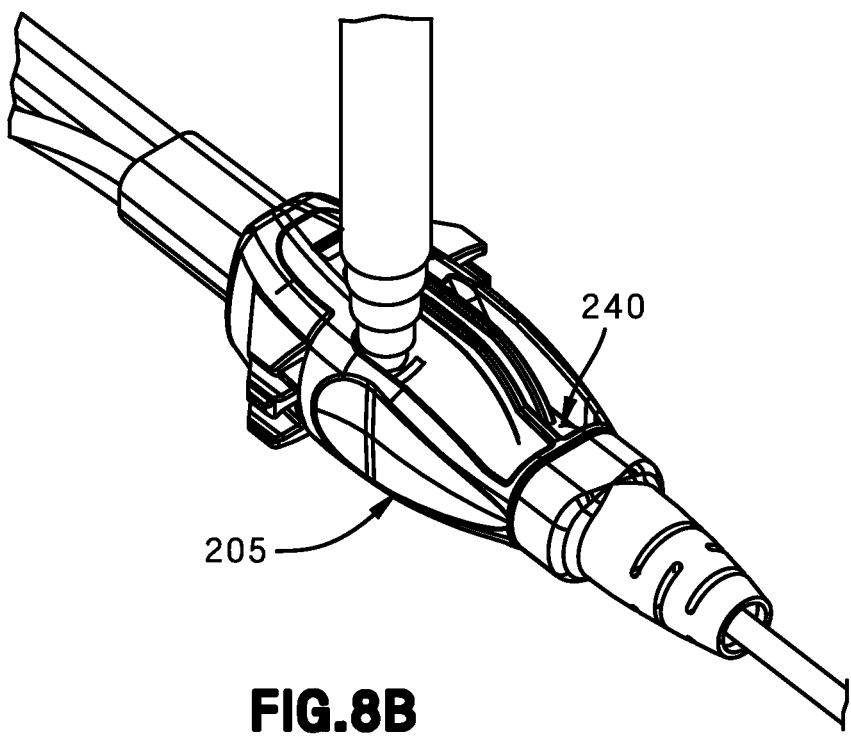

To complete the assembly of the transition 10, an adhesive is injected into the inner cavity thereof. As shown in FIGS. 8A and 8B, the rear housing 205 includes an adhesive fill hole 235 and an adhesive vent hole 240. The adhesive fill hole 235 is contoured to mate with an adhesive fill nozzle 245. This may help to achieve a better seal between the fill hole and the fill nozzle, and prevent adhesive from spilling onto the rear housing. The fill hole can also be recessed into the rear housing to provide a less obtrusive interface to the user. In some embodiments, the adhesive fill hole 235 is positioned off-center relative to the sides of the rear housing 205. Such a design may help prevent the adhesive nozzle tip from contacting the bare fibers inside the transition 10, and it may help prevent the force from the injected adhesive from moving or macro-bending the optical fibers inside of the transition 10. As the adhesive is injected into the inner cavity of the transition 10, an adhesive vent hole 240 allows air that would otherwise be trapped to escape. A predetermined amount of adhesive may be injected as necessary. Alternatively, a user may continue filling the cavity until adhesive is seen in the vent hole 240.

Given the contoured geometry of the internal surfaces of the front and rear housings, the internal cavity of the transition is able to closely house the bare fibers in a small volume. As a result, a relatively small amount of adhesive may be necessary to achieve a desired outcome. The reduced amount of adhesive applied inside of the transition may be beneficial for multiple reasons. For example, potting adhesive for fiber assemblies is often a more stable adhesive compound, it is difficult to manufacture and therefore more expensive to procure. Thus, the reduced adhesive usage can result in material cost-savings. Another potential benefit of reduced adhesive usage is improved fiber optic medium integrity. As with the plastic injection-molding process, non-uniform or thick molding features cause hot plastic to warp and sink. The equivalent occurs with the exothermic reaction of a potted epoxy (e.g., too much epoxy applied at one time can cause the adhesive to void, sink, or flex). This motion can impart a physical load to the internal optical fibers inside of the transition, potentially causing a microbend or a macrobend on the fiber optic glass. This can lead to reduced optical performance of the fiber optic medium. The reduced adhesive may therefore improve optical insertion/return loss performance across the transition.

As noted previously, when assembled, the front housing sub-assembly 200 forms a seal between the internal cavity of the transition and the front opening 140. Similarly, on the rear housing sub-assembly 201, the heat shrink forms a seal between the internal cavity of the transition and the rear end 223 of the rear housing 205. As a result, when the adhesive is injection into the transition, spillage/leakage of said adhesive from the front and/or rear ends of the transition are reduced or eliminated.

The adhesive used in the various embodiments of the present invention could be any suitable adhesive that can transition from a fluid state to a rigid hardened state over a period of some time. For example, the adhesive may be an epoxy-like substance which cures over a period of several minutes after injection. Alternatively, the adhesive may be an ultra-violet reactive substance which hardens under an ultra-violet light source. In this embodiment, the transition would require a means to allow the ultra-violet rays to reach the adhesive. For example, the front and/or rear housings may be made of clear or a semi-clear plastic. In still another embodiment, the rear housing 205 may be provided with multiple injection holes to enable the injection of multiple adhesives which react upon contact with one another.

Once hardened, the adhesive ensures that the furcation tubes are linked to the multi-fiber cable via a rigid structure. As a result, stress placed on the multi-fiber cable/furcation tubes is transferred directly to the furcation tubes/multi-fiber cable via the hardened adhesive without being transferred to the bare fibers. In addition, in embodiments where strength members are present in the furcation tubes and/or the multi-fiber cable, these strength members provide further structural elements which may be linked by way of the cured adhesive. These configurations may further decrease the likelihood of having forces placed on the multi-fiber cable/furcation tubes being transferred to the bare fibers within the transition.

Furthermore, when assembled, the elastomeric nature of the front boot can provide improved optical performance when a bending load is applied to the furcation tubes. For example, when applying a load at 90 degrees relative to the transition 10, the boot contours to a slight radius instead of allowing the furcation tubes to bend abruptly at 90 degrees. This helps to reduce stresses on the fibers and thereby improve optical performance when bending and applying a load to the furcation tubes. In one embodiment, the stress on the fibers is reduced and thereby optical performance is improved when a bending load is applied to the furcation tubes between 90 degree and 135 degrees relative to the length-wise axis of the transition.

In some embodiments, the front housing sub-assembly 200 can be pre-assembled and set aside for later use until a customer order is received for a specific length of hydra cable. This may be beneficial since it provides a manufacturing floor lower-priority work during a lull in production schedules. It may also allow a manufacturer to build product more quickly for rush customer orders, since a part of the overall assembly is already pre-built.

Figure 9A:
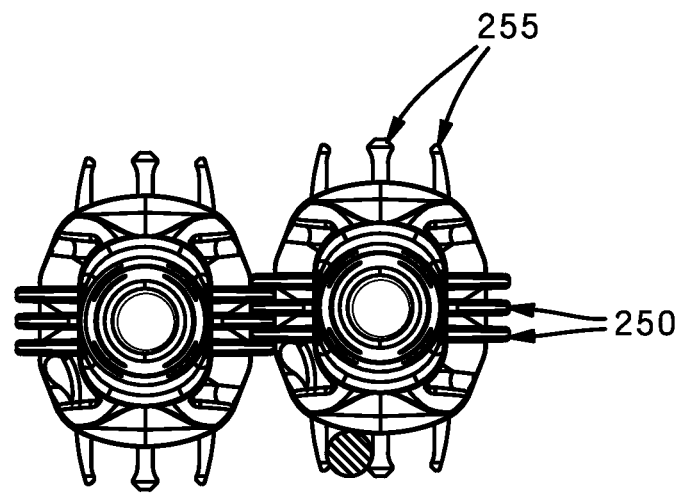
FIGS. 9A and 9B illustrate an embodiment of a means by which adjacent cable harnesses can be mated with one another.
Figure 9B:
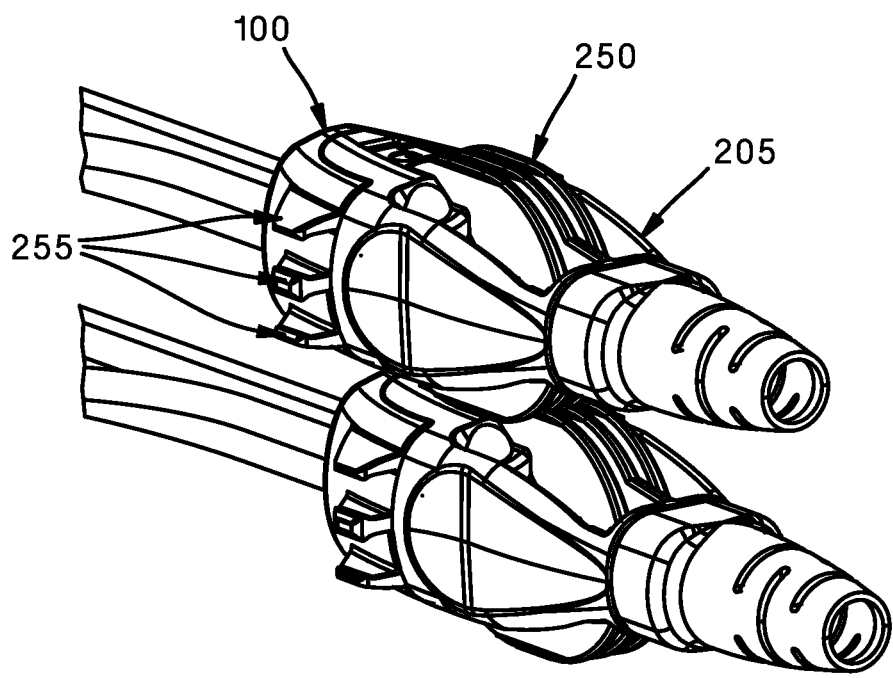

The hydra cable assemblies can include features which enable them to be mounted to each other in various ways. FIGS. 9A and 9B illustrate the first mounting means which employ symmetrical, tapered ribs 250 positioned on the rear housing 205. The rear housing ribs 250 are tapered such that when the rear housings are moved closer to one another there is additional interference which engages the parts to one another with a friction fit. The transitions can be removed from one another by pulling the transitions apart. This feature can allow multiple cable assemblies to be secured to one another in multiple orientations (e.g. with the transitions facing the same direction or facing opposite directions).

Figure 10:
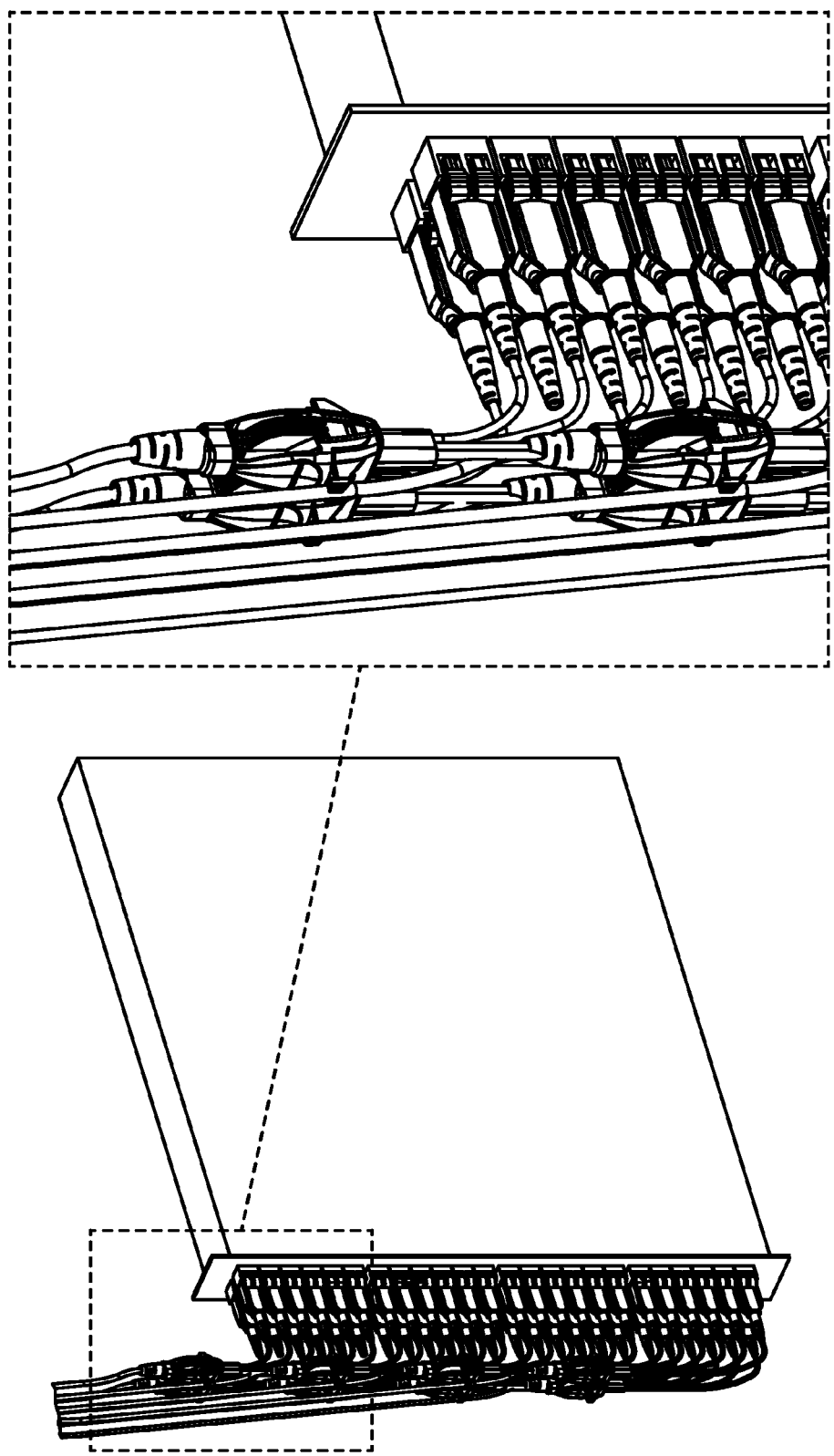
FIG. 10 illustrates another embodiment of a means by which adjacent cable harnesses can be mated with one another and an embodiment of a means by which cable harnesses can be secured to adjacent cables.

In addition to illustrating the previously discussed means, FIG. 10 illustrates a second means of mounting hydra cable assemblies to one another. In this embodiment, the transitions are attached to neighboring/surrounding cables via cable clips 255 (see FIGS. 9A and 9B). The cable clips are positioned on the front housing 100 and designed to snap around round cables (e.g., a 3 mm cable).

Figure 11:
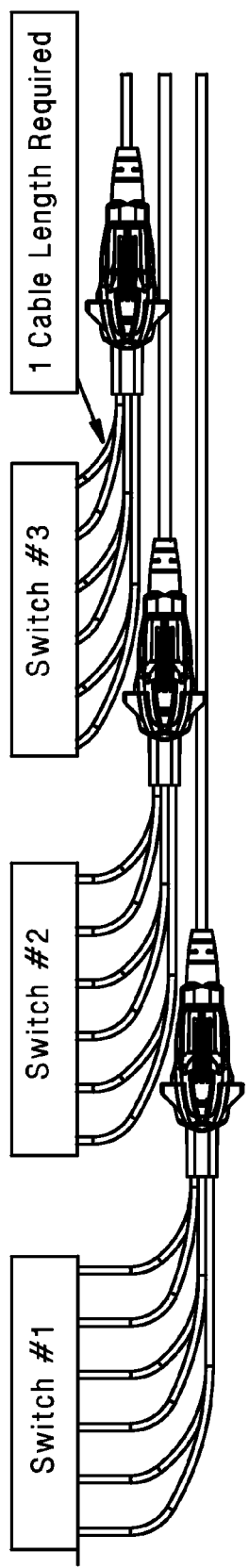
FIG. 11 illustrates another embodiment of a means by which cable harnesses can be secured to adjacent cables.

With either the front housing cable clips 255 or the rear housing rib features 250, the routing of the cable assemblies may be simplified. The front housing cable clips can allow multiple cables to be stacked next to one another in close proximity without the use of additional cable management products (e.g. hook-and-loop cables ties), and the transitions 10 themselves can be staggered relative to one another. This can be seen in FIGS. 10 and 11. Such a configuration may be beneficial to a user in that one cable part number may be purchased to patch across switches without additional loose cable management accessories.

Figure 12:
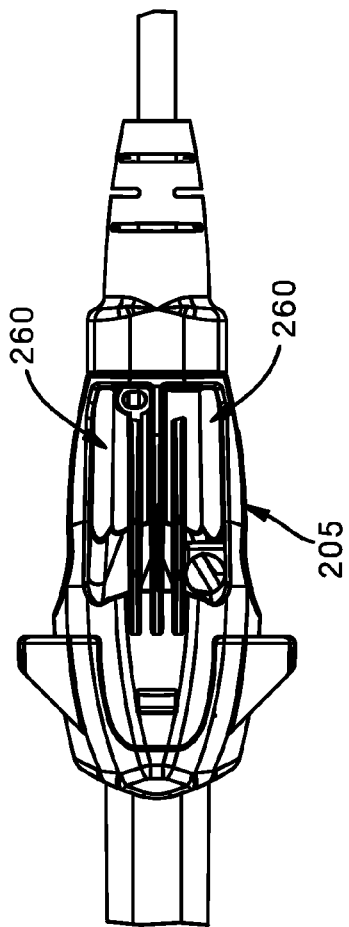
FIG. 12 illustrates an embodiment of a securing feature of a cable harness.

FIG. 12 illustrates yet another embodiment of mounting hydra cable assemblies to one another or to neighboring equipment. In this embodiment, multiple hydra cable assemblies are bound together with plastic and/or metal cable ties or a hook-and-loop cable tie (e.g., Velcro). These cable ties slides into the slot openings 260 located in the rear housing 205. One cable tie can be wrapped through the first slot opening and then through the second slot opening, allowing a user to secure a cable transition to a cabinet, enclosure, patch panel, etc. Alternately, a cable tie can be used to join multiple transitions to one another.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A fiber optic cable transition comprising:
   a front housing having a front opening, a rear opening, and an internal wall positioned inside of said front housing;
   a front boot having a distal end, a proximal end, and a flange, said front boot being positioned at least partially inside said front housing such that said flange abuts said internal wall; and
   a rear housing having a distal end and a proximal end;
   said rear opening of said front housing being joined to said proximal end of said rear housing.

2. The fiber optic cable transition of claim 1, wherein said front housing includes at least one latch, wherein said rear housing includes at least one latch-securing tab, and wherein said front housing is joined to said rear housing via said at least one latch-securing tab engaging said at least one latch.

3. The fiber optic cable transition of claim 1, wherein said front boot includes a generally hollow cavity extending between said front opening and said rear opening, said generally hollow cavity having a plurality of tapered ramps.

4. The fiber optic cable transition of claim 3, wherein said plurality of tapered ramps are positioned near said proximal end of said front boot.

5. The fiber optic cable transition of claim 1, wherein said front housing includes at least one guide rail, and wherein said front boot includes at least one notch, said at least one guide rail being received within said at least one notch.

6. The fiber optic cable transition of claim 1, wherein at least one of said front housing and said rear housing includes a fill hole, said fill hole being a pathway for adhesive to be delivered to an interior of said fiber optic cable transition.

7. The fiber optic cable transition of claim 6, wherein said fill hole is positioned off-center relative to any two directly opposing sides of said at least one of said front housing and said rear housing.

8. The fiber optic cable transition of claim 6, wherein at east one of said front housing and said rear housing further includes a vent hole.

9. The fiber optic cable transition of claim 1, wherein an interior surface of said front housing at least partially tapers inward from said rear opening towards said front opening such that said flange is at least one of in contact with and is compressed by said interior surface of said front housing.

10. The fiber optic cable transition of claim 1, wherein at least one of said front housing and said rear housing further includes at least one of cable clips and interlocking rib features.

11. A fiber optic cable harness comprising;
    a multi-fiber cable carrying a plurality of optical fibers;
    a plurality of furcation tubes; and
    a fiber optic cable transition including:
       a front housing having a front opening, a rear opening, and an internal wall positioned inside of said front housing;
       a front boot having a distal end, a proximal end, and a flange, said front boot being positioned at least partially inside said front housing such that said flange abuts said internal wall; and
       a rear housing having a distal end and a proximal end;
       said rear opening of said front housing being joined to said proximal end of said rear housing,
    said multi-fiber cable being received in said distal end of said rear housing, said plurality of furcation tubes being received in said front boot, and at least one of said plurality of optical fibers being routed from said multi-fiber cable to a respective one of said plurality of furcation tubes within said fiber optic cable transition.

12. The fiber optic cable harness of claim 11, wherein said front housing includes at least one latch, wherein said rear housing includes at least one latch-securing tab, and wherein said front housing is joined to said rear housing via said at least one latch-securing tab engaging said at least one latch.

13. The fiber optic cable harness of claim 11, wherein said front boot includes a generally hollow cavity extending between said front opening and said rear opening, said generally hollow cavity having a plurality of tapered ramps defining a plurality of apertures, each of said plurality of apertures receiving one of said plurality of furcation tubes.

14. The fiber optic cable harness of claim 13, wherein said plurality of tapered ramps are positioned near said proximal end of said front boot.

15. The fiber optic cable harness of claim 11, wherein said front housing includes at least one guide rail, and wherein said front boot includes at least one notch, said at least one guide rail being received within said at least one notch.

16. The fiber optic cable harness of claim 11, wherein at least one of said front housing and said rear housing includes a fill hole, said fill hole being a pathway for adhesive to be delivered to an interior of said fiber optic cable transition.

17. The fiber optic cable harness of claim 16, wherein said fill hole is positioned off-center relative to any two directly opposing sides of said at least one of said front housing and said rear housing.

18. The fiber optic cable harness of claim 16, wherein at least one of said front housing and said rear housing further includes a vent hole.

19. The fiber optic cable harness of claim 16, wherein at least one of said multi-fiber cable and said plurality of furcation tubes include strength members, and wherein said strength members are routed to said interior of said fiber optic cable transition.

20. The fiber optic cable harness of claim 11, wherein an interior surface of said front housing at least partially tapers inward from said rear opening towards said front opening such that said flange is at least one of in contact with and is compressed by said interior surface of said front housing.

\* \* \* \* \*